United States Patent Office 3,301,222
Patented Jan. 31, 1967

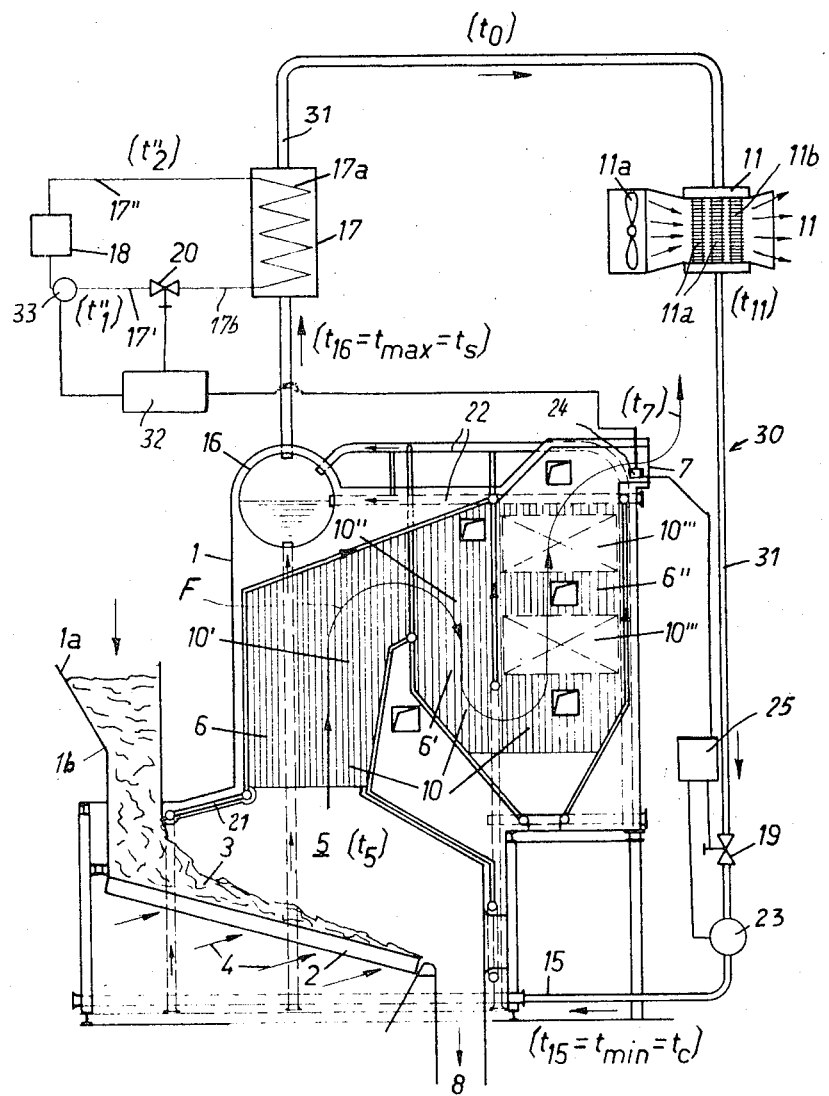

3,301,222
METHOD AND FURNACE FOR THE COMBUSTION OF LOW-GRADE FUELS, FOR INSTANCE REFUSE AND THE LIKE
Richard Tanner, Zurich, Switzerland, assignor to Von Roll A.G., Gerlafingen, Switzerland, a corporation of Switzerland
Filed Feb. 15, 1965, Ser. No. 432,530
Claims priority, application Switzerland, Feb. 20, 1964, 2,020/64; Dec. 3, 1964, 15,666/64
11 Claims. (Cl. 122—2)

The present invention has reference to an improved method of and furance or incinerator for the combustion of low-grade or inferior fuels, for instance refuse, garbage and the like.

More specifically, the present invention pertains to an improved furnace for the combustion of low-grade fuels, refuse for instance, without direct heat recovery, such furnace incorporating an internally arranged primary heat exchanger which at least partially bounds the furnace combustion chamber and is contacted by the flue gases. Moreover, a heat carrier circulated in a primary closed cycle flows through this primary heat exchanger, and there can be further provided a secondary heat exchanger in this closed cycle and externally of the furnace serving as a cooler.

Generally speaking, the present invention is characterised by the features that for the purpose of indirect heat recovery of at least a portion of the heat generated in the furnace an additional heat exchanger is provided outside of the furnace in the primary closed cycle system for the heat carrier, this additional heat exchanger being operably connected with a heat-consumer via its secondary portion. According to a further important aspect of the invention means are provided for controlling the quantity of primary heat carrier flowing through the primary closed cycle such as to maintain the temperature of the flue gases leaving the furnace constant or substantially constant.

It is, therefore, a primary object of the present invention to provide an improved furnace for the combustion of low-grade fuels which is of relatively simple and economical construction, incorporating an additional heat exchanger arranged externally of the furnace and in a primary closed cycle system for a primary heat carrier.

Another important object of this invention has reference to an improved method of operating a furnace fired with low-grade fuels as well as an improved furnace for the combustion of such low-grade fuels wherein an additional heat exchanger is arranged externally of the furnace in a closed cycle for a primary heat carrier, this aforesaid heat exchanger furnishing a heat-consumer with heat.

Still another important object of this invention is the provision of an improved furnace construction whereby a heat-consumer can be furnished with heat by a primary heat carrier circulating in a closed cycle.

Yet a further noteworthy object of this invention resides in the furnishing of a heat-consumer arranged externally of a furnace for the combustion of low-grade fuels with heat in such a manner that corrosive effects which might occur by virtue of the composition of the flue gases is avoided or at least considerably minimized.

Prior to describing in greater detail a preferred embodiment of inventive furnace of the type described and depicted in the accompanying drawing, there will be initially considered the mode of operation of the furnace as well as its advantages with regard to thermal requirements so that it will be easier to understand the physical structure of the furnace and the concepts upon which its reduction to practice were based.

If the closed cycle system for the primary heat carrier is considered more closely it will be recognized that for the same rate of heat which is exchanged the difference between the boundary temperatures $t_{max}$ and $t_{min}$ of the primary heat carrier is dependent upon whether the heat carrier does or does not undergo a change in phase. Stated more precisely, whether a vaporization and subsequent condensation, that is liquification, of the heat carrier takes place, whereby in order to maintain such consideration quite general it is assumed that such a change of the aggregate state occurs for a portion of the throughflow quantity of the primary heat carrier.

In the subsequent consideration, wherein the possibility of superheating of the vaporous heat carrier is eliminated, the following key is employed:

$G$ = total throughflow rate of primary heat carrier in the closed cycle (kg./h.).
$G'$ = partial or component quantity of primary heat carrier which undergoes a change in phase (kg./h.).
$r$ = specific heat for the change in phase (kcal./kg.).
$c$ = average specific heat of the heat carrier (kcal./kg. ° C.).
$Q$ = rate of heat exchange (kcal./h.).

Consequently, the magnitude of the exchanged quantity of heat can be expressed by the relationship:

$$Q = G \cdot c \cdot (t_{max} - t_{min}) + G' \cdot r \quad (1)$$

Under the previously mentioned condition that vaporization of the primary heat carrier takes place without superheating of the resulting vapor, the highest temperature $t_{max}$ of the heat carrier is identical with its saturation temperature $t_s$, the latter of which is dependent upon the selected operating pressure $p$ (absolute pressure in atmospheres) in the closed cycle. On the other hand, practical experience has shown that the lowest temperature $t_{min}$ should not fall below a certain minimum value in order to prevent disadvantageous corrosion effects, this minimum temperature is in the order of magnitude of about 150° C. to 200° C. and herein conveniently designated by reference character $t_c$.

Thus, from the previously listed Equation 1 there results the following:

$$Q = G \cdot c (t_s - t_c) + G' \cdot r \quad (1a)$$

In practice, a sufficiently high operating absolute pressure $p$ is selected in order that the saturation temperature $t_s$ lies considerably above the lowest temperature $t_c$ which is not to be fallen below. If, for example, water is used as the primary heat carrier then in all cases an absolute pressure in atmospheres amounting to 25 is sufficient, such ensuring for a value of $t_s$ of 223° C.

Equation 1a clearly shows that it to the closed cycle the operating pressure $p$ of the primary heat carrier and its circulating quantity are held constant, the heat exchange achieveable with such heat carrier can be varied within wide limits. From the Equation 1a it becomes apparent that the vaporized partial quantity $G'$ of the primary heat carrier is a function of the total throughflow quantity $G$ of the heat carrier for each optional value of the exchanged quantity of heat Q, so that finally Q is a function only of G, that is, $Q = f(G)$. As a result, it will be seen that by increasing or reducing the total throughflow quantity G of the primary heat carrier per unit of time in the closed cycle there exists the possibility of accommodating the mode of operation of the primary heat exchange system to the momentary thermal load of the furnace, the throughput of fuel (in kg./h.) and the calorific value (in kcal./kg.) of the waste to be burned, for example refuse.

The possibility of accommodation of the exchanged quantity of heat with constant, uniform selected operating pressure $p$, expressed by the Equation 1a, permits using, for a given size furnace, a standard construction of the heating- and cooling-systems embodied in the primary closed cycle. These systems need only then be designed in accordance with the thermal capacity and rated load of the furnace. This provides a considerable rationalization in fabrication, since the primary heat exchanger for heating up the heat carrier and the secondary heat exchanger provided for cooling of such heat carrier can be produced in standard construction at relatively small fabrication costs, thereby providing a considerable technological advance in the art.

The heat-consumer which should be operably connected with the combustion furnace possesses a heat absorption which can be expressed by reference character $Q''$ (kcal./h.). With the furnace proposed in this instance, this consumer should have delivered thereto this quantity of heat $Q''$ only directly via a secondary heat carrier. This secondary heat carrier can circulate in a closed or open cycle, specifically with a throughout per unit of time which is designated by reference character $G''$ (in kg./H.), and with an inlet and outlet temperature $t''_1$ and $t''_2$ respectively, with respect to the heat-consumer. Consequently, there exists the equation:

$$Q'' = G'' \cdot c'' (t''_1 - t''_2) \qquad (2)$$

wherein, $c''$ denotes the average specific heat of the secondary heat carrier. In actual practice it oftentimes occurs that the heat-consumer consists of a heating installation wherein hot water is employed as secondary heat carrier (with an average specific heat $c'' = 1$ kcal./kg. °C.), and wherein often the inflow temperature $t''_1$ equals approximately 70° C. and the outflow temperature $t''_2$ equals approximately 40° C. With such relatively low temperature values which lie considerably beneath the relevant values of the boundary temperatures $t_s$ and $t_c$ of the primary heat carrier which are conditional upon operation, a direct branching-off of a component stream from the closed cycle system of the primary heat carrier for the purpose of furnishing the heat-consumer directly with the heat conveyed by the primary heat carrier is not at all possible.

For such reason, with the furnace proposed in the present instance there is provided an additional heat exchanger in the closed cycle of the primary heat carrier, wherein the secondary portion of this heat exchanger, whether such be in an open or closed circulation system, is operably connected with the heat-consumer. Moreover, a secondary heat carrier flowing in this circulation system which is heated-up in such additional heat exchanger delivers its heat to the heat-consumer.

For obvious reasons, this additional heat exchanger is arranged as much as is possible at such location of the circulation system or closed cycle for the primary heat carrier where such heat carrier has its greatest enthalpy, that is, possesses its highest heat content (in kcal./kg.). In other words, at a location where there still appears the saturation temperature $t_2$, that is, in the region of the outlet of the primary heat carrier from the furnace.

For this additional heat exchanger which is arranged externally of the furnace and in addition to the secondary heat exchanger disposed in the closed cycle for the primary heat carrier, there can likewise be used a standard construction. This additional heat exchanger is designed for the thermal load of the furnace (thermal rated load in kcal./h.) and the thermal requirements (in kcal./h.) of the heat-consumer, while taking into consideration an accommodation of the delivered quantity of heat $Q''$ to the momentary heat requirements. More specifically, such is done in fact under circumstances up to the complete nullification of the useful delivery of heat ($Q'' = 0$), whereby such accommodation is already achieved in that the throughflow quantity $G''$ (in kg./h.) of the secondary heat carrier according to the above Equation 2 is changed while maintaining constant the temperatures $t''_1$ and $t''_2$.

As a result, this additional heat exchanger can be produced in standard construction in series fabrication at relatively low manufacturing costs.

A closer examination of both of the above Equations 1a and 2 gives information regarding the possibility of controlling the invention installation, and indeed:

(1) For the primary closed cycle system:

(a) Maintaining constant the operating pressure $p$ at a predetermined value, for instance at an absolute pressure in atmosphere of 25 for the considered case;

(b) Regulating the throughflow quantity $G$ (in kg./h.) of the primary heat carrier in order to maintain the temperature of the flue gases emanating from the furnace and the temperature $t_c$ of the primary heat carrier entering the furnace at predetermined values, which lie approximately at 250° C. to 300° C. and at 150° C. to 200° C. respectively, and which for the purpose of preventing damaging corrosion should not be fallen below.

(2) For the secondary circulation systems:

Control or regulation of the throughflow quantity $G''$ (in kg./h.) of the secondary heat carrier in order to maintain the infeed temperature $t''_1$ and, in the case of a closed cycle system, the return-or outflow temperature $t''_2$ at predetermined values, for instance 70° C. and 40° C. respectively.

Such regulation can easily be automated because the factors which are to be maintained constant at predetermined values can be directly measured and, therefore, can be employed as control factors for the regulation.

Other features, objects and advantages of the invention will become more readily apparent by referring to the drawing where there is schematically illustrated in longitudinal sectional view an embodiment of the inventive incinerator or furnace.

Preliminarily, it is mentioned that in the subsequent description of the inventive embodiment the various prevailing temperatures are designated by reference character "$t$" together with subscripts in the form of numbers applied to reference character "$t$," with such numbers corresponding to those reference numeral appearing in the drawing which designate the corresponding location at which the relevant temperatures prevail. It is also to be understood that in the embodiment depicted for illustrative purposes there has been chosen, by way of example, a closed cycle for the secondary closed cycle system.

Describing now the single figure it will be recognized that there is shown a triple-flue furnace or incinerator 1 utilizing a grate firing. This incinerator 1 is employed for the combustion of low-grade fuels, for instance refuse, garbage or other waste materials, and in particular is used in communal large-scale plants for the destruction of refuse. More specifically, the fuel, refuse for example, is deposited upon a grate 2 through the agency of a filling or infeed device 1a, which in the present embodiment is constructed as an infeed or filling shaft 1b. The fuel which is deposited upon the grate 2 in the form of a fuel bed or layer 3 is successively pre-dried, ignited and totally burned in known manner upon the aforesaid grate 2. The combustion air necessary for the combustion of the fuel layer 3 is delivered from beneath the permeable grate 2 to the layer of fuel 3 in the form of an undergrate blast, such being schematically indicated in the drawing by reference numeral 4. The gaseous products of combustion, hereinafter conveniently referred to as flue gases, resulting from the burning of the layer of fuel 3 in the combustion chamber 5 successively flow through three furnace flues 6, 6' and 6", leaving the furnace 1 at an exit location 7. The flow of the flue gases from the combustion chamber 5 to the exit or outlet location 7 is schematically represented by the serpentine line F.

The flue gases leaving the exit location 7 of the furnace 1 flow in known manner through a de-dusting or cleaning installation, thereafter a suction device such as a suction ventilator, finally escaping into the surrounding atmosphere via a chimney or smoke stack. The latter can under circumstances, and if it possesses a sufficient height, replace the suction ventilator. Moreover, the generally solid, non-combustible residues, slag for instance, resulting from the combustion of the layer of fuel 3 are removed from the furnace 1 at the residue-removal location 8.

The hot flue gases upon flowing through the furnace flues 6, 6' and 6" transmit their heat to three heating surface systems 10', 10" and 10'". It will be seen that such heating surface systems 10', 10", 10'" are disposed behind one another with respect to the direction of flow of the flue gases through the furnace 1 in the three furnace flues 6, 6' and 6" respectively. Furthermore, these three heating surface systems 10', 10" and 10'" collectively form a primary heat exchanger 10 serving to heat-up a primary heat carrier. The heating surfaces 10', 10" and 10'" of the primary heat exchanger 10 are composed of a system of tubes through which the primary heat carrier flows and which, for instance, are constructed as a nest of boiler tubes or as wall tubing. The heating system or primary heat exchanger 10 incorporating the three partial heating surface systems 10', 10" and 10'" also encompasses the required inflow- and outflow-conduits, which have only been schematically illustrated in the drawing by reference numerals 21 and 22 respectively, as well as advantageously further incorporating a collecting drum 16.

The primary heat exchanger 10 together with its collecting drum 16 is arranged in a closed cycle system, generally designated by reference numeral 30, and incorporating the conduit means 31 through which flows the primary heat carrier. The heat carrier is circulated, by way of example, through the closed cycle system 30 by means of a mechanical circulating pump 23 or equivalent structure, the function of which will be more fully considered hereinafter. Such circulation could also conceivably be carried out by a so-called thermosiphon effect. Irrespective of the manner in which the heat carrier is circulated through the closed cycle system, such primary heat carrier can also be under a given pressure since it flows in a closed cycle system.

It will be observed that the tubes of the heating surface system 10' of the primary heat exchanger 10 border the combustion chamber 5 and, thus, are particularly exposed to the radiant heat emanating from the aforesaid combustion chamber. Hence, the heating surface system 10' can be considered to define a radiation portion of the primary heat exchanger 10. On the other hand, the nest of tubes of the heating surface systems 10" and 10'" which are arranged in the successive furnace flues 6' and 6" respectively, are subjected to the action of heat by convection, that is to say, through direct contact with the flue gases flowing past the tubes of the aforesaid heating surface systems 10" and 10'". Thus, heating surface systems 10" and 10'" can be considered to define a convection portion of the primary heat exchanger 10.

The primary heat carrier is supplied at location 15, and as previously mentioned, flows through the primary heat exchanger 10, leaving the latter via the collecting drum 16. In so doing, the primary heat carrier is not only heated-up in the primary heat exchanger 10 by the flue gases from the inlet temperature $t_{15}$ to the outlet temperature $t_{16}$, rather, at the same time it experiences a partial or total change in phase in that, namely, at least a partial quantity G' (in kg./h.) of the total quantity G in kg./h.) of the primary heat carrier, due to heating in the heat exchanger 10, changes from the liquid state into the vaporous state, that is, evaporates.

The furnace inlet temperature $t_{15}$ of the primary heat carrier is the lowest temperature ($t_{min}$) prevailing in the closed cycle system 30 for the primary heat carrier. It should be understood that this temperature $t_{15}$ in consideration of possible corrosion effects should not fall below a minimum value ($t_c$), which is in the order of magnitude of 150°–200° C. The outlet temperature $t_{16}$ of the primary heat carrier defines the highest temperature ($t_{max}$) prevailing in the closed cycle system 30, and preferably, while eliminating the possibility of superheating of the steam, is selected as the saturation temperature ($t_s$) associated with the operating pressure $p$.

Due to the delivery of heat to the heating surfaces 10', 10" and 10'" of the primary heat exchanger 10 and, thus, to the primary heat carrier the hot flue gases coming from the combustion compartment 5 cool down, so that their temperature $t_7$ at the outlet location 7 is considerably below the temperature $t_5$ in the combustion compartment 5 ($t_7 < t_5$). Consequently, the primary heat carrier flowing through the primary heat exchanger 10 serves, apart from its conveying function to make use of the useable heat generated in the furnace 1, as a cooling medium for cooling down the hot flue gases.

It is to be readily appreciated that since the heating surface systems 10', 10" and 10'" of the primary heat exchanger 10 need only be designed in accordance with the thermal capacity or rated load of the furnace 1, this heat exchanger 10 can, therefore, be advantageously manufactured in series as a standard construction.

Furthermore, an additional heat exchanger 17 is arranged in the closed cycle system 30 for the primary heat carrier externally of the furnace 1 such that the primary heat carrier, after leaving the collecting drum 16, enters such additional heat exchanger 17. The secondary portion 17a of this additional heat exchanger 17 is connected via an outflow line or conduit 17' as well as a return line or conduit 17" with a heat-consumer 18, thereby forming a further closed cycle system 17b. In this closed cycle system 17b water for instance circulates as a secondary heat carrier, in a manner typically very often employed in heating installations. The secondary heat carrier during its flow through the heat exchanger 17 removes a certain quantity of heat (in kcal./h.) from the hot primary heat carrier, whereby its temperature climbs to a value $t''_1$. This heat is then delivered by the secondary heat carrier to the heat-consumer 18, such secondary heat carrier then again cooling-off, so that its temperature drops to a value $t''_2$. The cooled-off secondary heat carrier then again enters the secondary portion 17a of the heat exchanger 17 at this temperature $t''_2$, in order to there be heated-up again to the temperature $t''_1$. In so doing, and as is oftentimes the case, the infeed temperature $t''_1$ amounts to approximately 70° C. and the return flow temperature $t''_2$ amounts to about 40° C.

With these relatively low operating temperatures of the heat-consumer 18, which lie considerably beneath the temperatures ($t_{max}$, $t_{min}$) of the primary heat carrier, branching-off of a component or partial stream from the closed cycle 30 of the primary heat carrier for the purpose of directly supplying heat to the heat-consumer 18 can of course not be undertaken. For this reason the additional heat exchanger 17 is provided in the primary closed cycle 30, the secondary portion 17a of which furnishes the heat-consumer 18 with heat. In so doing, for obvious reasons heat exchanger 17 is arranged at that location of the primary closed cycle 30 where the primary heat carrier attains its highest enthalpy, that is has its greatest heat content (in kcal./kg.), in other words at the saturation temperature $t_s$, because superheating of steam should not take place. It will further be appreciated that, as in the case of the primary heat exchanger 10, the additional heat exchanger 17 can utilize a normal or standard construction which is designed for the thermal rated load of the furnace 1 and the heat requirements of the heat-consumer 18 while taking into consideration the required controllability of the latter.

A cooling system 11 which advantageously likewise exhibits tubes 11b for the purpose of heat exchange, is arranged externally of the furnace 1 and in the direction of flow downstream or behind the just considered additional heat exchanger 17 in the closed cycle system 30 for the primary heat carrier, the latter delivers its heat to the surroundings, whereby opposite changes in phase can occur to that in the primary heat exchanger 10, in other words a transition takes place from the vapor aggregate state into the liquid aggregate state. During such cooling the enthalpy (in kcal./kg.) and the temperature of the primary heat carrier drop further, so that a temperature $t_{11}$ appears at the primary heat carrier which, however, still lies above the temperature $t_{15}$ at the inlet 15 into the furnace 1. The delivery of heat to the surroundings by the primary heat carrier in the secondary heat exchanger 11 with a given ambient temperature $t_0$ can be increased in known manner, for example, through impinging the cooling system 11 with a current of cold air, this being depicted in the drawing by the air-ventilator 11a. Naturally, instead of air it is also possible to use water as the cooling medium for the secondary heat exchanger 11 serving as cooler means for the cooling medium.

The control of the previously described over-all system will now be considered hereinafter:

It can be seen that a regulating or control element 19, a control valve for instance, is arranged in the circulation system 30 of the primary heat carrier in order to adjust the heat exchange brought about by the primary heat carrier with respect to the momentary thermal load of the furnace 1. With the aid of the regulating member 19 the throughflow quantity G (in kg./h.) of the primary heat carrier can be regulated to the momentary thermal load of the furnace, whereby there must be ensured for the holding constant or substantially constant of the outlet temperature $t_7$ of the flue gases and in consideration of corrosion not to fall below the lowest temperature $t_c$ of the primary heat carrier at the furnace inlet location 15 ($t_{15} = t_c$).

To this end, it will be seen that a temperature feeler 24 is arranged at the outlet location 7 for the flue gases and acts upon a control device 25 which either controls the regulating member 19 or the pump 23, or both, in order to control the quantity of primary heat carrier circulating through the primary closed cycle system 30 as a function of the outlet temperature $t_7$ of the flue gases. For instance, if it is assumed that the pump 23 is a suitable variable displacement pump then the control device 25 controls the throughflow in the primary closed cycle 30 by regulating the displacement of the pump. Additionally, if it is desired that the displacement of such pump 23 does not fall below a minimum value then control device 25, under such circumstances, can simultaneously also control the regulating valve 19. On the other hand, if it is assumed that the pump 23 is of the constant displacement type then the control device 25 acts upon the regulating valve 19 and appropriately opens and closes the same as a function of the outlet temperature $t_7$ of the flue gases to regulate the throughflow through the mentioned primary closed cycle 30.

Additionally, the possibility exists for regulating the primary circulation system 30 to employ the operating pressure $p$ of the primary heat carrier, in that the latter is maintained constant at a pre-selected level or range, for example at an absolute pressure in atmospheres of 25.

In quite analogous manner a regulating or control member 20, for instance a regulating or control valve, is arranged in the closed cycle 17b of the secondary heat carrier in order to accommodate the effective quantity of heat (kcal./h.) delivered to the heat-consumer 18 with respect to the momentary heat requirements. By means of this regulating valve 20 the throughflow quantity G' (in kg./h.) of the secondary heat carrier (warm water for instance), can be adjusted to the temporary heat-removal by the heat-consumer 18. In so doing, it can be advantageous under circumstances to reduce, by means of the regulating valve 20, the quantity of heat removed for useful purposes, depending upon heat requirements, up to its complete nullification.

It will further be understood that the regulating elements 19 and 20 arranged in the respective closed cycles 30 and 17b for the primary and secondary heat carriers can be automatically regulated as a function of the thermal load of the furnace and the useful removal of heat by the heat-consumer 18 respectively, whereby it is readily possible to control both of these regulating elements 19, 20 with the aid of values or factors which can be measured by maintaining the same constant at predetermined reference values. It will be recalled that such has already been considered previously where regulating valve 19 is controlled as a function of the outlet temperature $t_7$ of the flue gases in order to control throughflow of the primary heat carrier in the primary closed cycle 30 in order to maintain such outlet temperature constant. Quite obviously, a similar arrangement, such as control device 32 can be provided for the control of the regulating valve 20 and, in fact, a circulating pump 33 also controlled by control device 32 can also be arranged, if desired, in the secondary closed cycle 17b.

One of the prime advantages of the proposed combustion furnace 1 for the burning of low-grade fuels with the provision of an additional heat exchanger 17 resides in the fact that, it is now possible to furnish a heat-consumer 18 with useable heat from the combustion furnace 1 without the differences of the relevant heat-consumer and its operating requirements for the realization of the closed circulation system for the medium serving as cooling medium for the cooling of the flue gases as well as heat carrier for the furnishing of heat to such heat-consumer in each case requiring a particular arrangement and design of the employed heat exchange system. In other words, there is not required an expensive individual fabrication providing a particular solution for the temporarily encountered situation.

In so doing, there exists the condition that there is not undertaken a branching-off of a certain quantity of heat carrier from the mentioned closed circulation system for furnishing the heat-consumer with heat. This results, in the advantage that now also in those very numerous situations where the heat-consumer exists as a heating installation with hot water as the secondary heat carrier and wherein a branching-off of a partial stream from the closed cycle of the primary heat carrier for the direct furnishing of heat by the primary heat carrier to the heat-consumer is not possible at all because of the low operating temperatures ($t''_1$ equals approximately 70° C. and $t''_2$ equals approximately 40° C.), in this case the furnishing of heat to such a heating installation can be realized, notwithstanding the fact that such heat supply is effected through the refuse incinerator or furnace.

A further advantage of the proposed furnace or incinerator resides in the fact that the strong corrosion brought about by the aggressive nature of the combustion gases is prevented, such would otherwise occur if a partial stream of the primary heat carrier is branched-off from its closed cycle for the purpose of furnishing the heat-consumer, since a like quantity of the same heat carrier at a relatively low temperature, corresponding to the ambient temperature $t_0$, must be delivered into the closed cycle.

If the heat-consumer 18 perhaps has a heat requirement such that it removes with the aid of the additional heat exchanger 17 so much heat from the primary heat carrier that the temperature of the heat carrier after leaving the heat exchanger 17 already corresponds to the inlet temperature ($t_{15} = t_{min} = t_c$) provided for entry into the furnace 1 at location 15, then under circumstances it is possible, in fact, to dispense with the secondary heat exchanger 11. In this case, the additional heat exchanger 17 provided for the heat consumer 18 can simultaneously serve as cooler for cooling the primary heat carrier heated in the furnace 1 by means of the flue gases and via the primary heat exchanger 10.

Under circumstances there also exists the possibility to operate an installation constructed according to the embodiment depicted in the drawing such that, the secondary heat exchanger 11 is only then always placed into operation when the removal of heat from the primary heat carrier via the heat-consumer 18 is relatively small, whereas otherwise, that is during relatively great heat-removal, the air-ventilator 11a is shutdown and/or the primary heat carrier is by-passed around the secondary heat exchanger 11 via a by-pass line or equivalent structure.

While there is shown and described a present preferred embodiment of the invention and there is illustrated a present preferred embodiment of practising the same, it is to be distinctly understood that the invention is not limited thereto but may be otherwise variously embodied and practised within the scope of the following claims.

What is claimed is:

1. Furnace for the combustion of low-grade fuels, such as refuse, without direct heat recovery comprising a combustion compartment for the burning of a low-grade fuel, a primary heat exchanger arranged internally of the furnace, said primary heat exchanger being contacted by the flue gases emanating from burning of the low-grade grade fuel, means providing a primary closed cycle with said primary heat exchanger for the circulation of a primary heat carrier through said primary heat exchanger, an additional heat exchanger disposed externally of said furnace and in said primary closed cycle for said heat carrier, said additional heat exchanger serving for the indirect recovery of at least a portion of the heat generated in said furnace, a heat-consumer operably connected with said additional heat exchanger, a secondary heat exchanger serving as a heat-dissipating cooler arranged in said primary closed cycle externally of said furnace and in series with said additional heat exchanger capable of dissipating heat independently of or simultaneously with said additional heat exchanger, means for controlling the throughflow of primary heat carrier through said primary closed cycle as a function of the outlet temperature of said flue gases from the furnace in order to keep such flue gas-outlet temperature substantially at a predetermined value, means providing a secondary cycle for the flow of a secondary heat carrier from said additional heat exchanger to said heat-consumer, means for controlling the throughflow of secondary heat carrier to said heat-consumer in dependency of the useful removal of heat by said heat-consumer and as a function of the outlet temperature of said flue gases from the furnace in order to keep such flue gas-outlet temperature substantially at a predetermined value.

2. Furnace for the combustion of low-grade fuels, such as refuse, without direct heat recovery comprising a combustion compartment for the burning of a low-grade fuel, a primary heat exchanger arranged internally of the furnace, said primary heat exchanger being contacted by the flue gases emanating from buring of the low-grade fuel, means providing a primary closed cycle with said primary heat exchanger for the circulation of a primary heat carrier through said primary heat exchanger, an additional heat exchanger disposed externally of said furnace and in said primary closed cycle for said heat carrier, said additional heat exchanger serving for the indirect recovery of at least a portion of the heat generated in said furnace, a heat-consumer operably connected with said additional heat exchanger, a secondary heat exchanger serving as a heat-dissipating cooler arranged in said primary closed cycle externally of said furnace and in series with said additional heat exchanger capable of dissipating heat independently of or simultaneously with said additional heat exchanger, means for controlling the throughflow of primary heat carrier through said primary closed cycle as a function of the outlet temperature of said flue gases from the furnace in order to keep such flue gas-outlet temperature substantially at a predetermined value, said controlling means for the control of the throughflow of primary heat carrier incorporating a temperature feeler arranged in the region where the flue gases leave the furnace, and a control device responsive to operation of said temperature feeler.

3. Furnace for the combustion of low-grade fuels as defined in claim 2, said controlling means further including a circulating pump arranged in said primary closed cycle and acted upon by said control device.

4. Furnace for the combustion of low-grade fuels as defined in claim 2, said controlling means further including a regulating valve disposed in said primary closed cycle and acted upon by said control device.

5. Method for the combustion of low-grade fuels in a furnace, such as refuse, without direct heat recovery comprising the steps of: burning a low-grade fuel in a combustion compartment of the furnace, circulating a primary heat carrier through a primary heat exchanger disposed within said furnace and arranged in a closed cycle, conducting the flue gases generated through combustion of the low-grade refuse past said primary heat exchanger and in heat exchange relation with said primary heat carrier, measuring the temperature of the flue gases leaving the furnace, and controlling the throughflow of primary heat carrier through said closed cycle as a function of the outlet temperature of said flue gases in order to maintain such outlet temperature substantially constant.

6. Method for the combustion of low-grade fuels in a furnace, such as refuse, without direct heat recovery comprising the steps of: burning a low-grade fuel in a combustion compartment of the furnace, circulating a primary heat carrier through a primary heat exchanger disposed within said furnace and through an additional heat exchanger and a series connected secondary heat exchanger which are disposed externally of the furnace, said primary heat exchanger, said secondary heat exchanger, and said additional heat exchanger being arranged in a closed cycle, conducting the flue gases generated through combustion of the low-grade refuse past said primary heat exchanger and in heat exchange relation with said primary heat carrier, measuring the temperature of the flue gases leaving the furnace, controlling the throughflow of primary heat carrier through said closed cycle as a function of the outlet temperature of said flue gases in order to maintain such outlet temperature at a predetermined value, and delivering heat to a heat-consumer via said additional heat exchanger.

7. Method for the combustion of low-grade fuels as defined in claim 6 including the step of controlling the delivery of heat to said heat-consumer as a function of a measurable control factor.

8. Method for the combustion of low-grade fuels in a furnace, such as refuse, without direct heat recovery, as defined in claim 6, further including the step of additionally dissipating heat from said closed cycle via said secondary heat exchanger in order to control the temperature of said primary heat carrier.

9. Furnace for the combustion of low-grade fuels, such as refuse, without direct heat recovery comprising a combustion compartment for the burning of a low-grade fuel, a primary heat exchanger arranged internally of the furnace, said primary heat exchanger being contacted by the flue gases emanating from burning of the low-grade fuel, said primary heat exchanger including a system of tubes for the throughflow of a primary heat carrier, said primary heat exchanger embodying a radiation portion in said combustion compartment and a convection portion disposed in the path of flow of the flue gases, means providing a primary closed cycle with said primary heat exchanger for the circulation of a primary heat carrier through said primary heat exchanger, an additional heat exchanger disposed externally of said furnace and in said primary closed cycle for said heat carrier, said additional heat exchanger serving for the indirect recovery of at least a portion of the heat generated in said furnace, a heat-consumer operably connected with said additional heat exchanger, a secondary heat exchanger serving as a heat-dissipating cooler arranged in said primary closed cycle externally of said furnace and in series with said additional heat exchanger capable of dissipating heat independently of or simultaneously with said additional heat exchanger, and means for controlling the throughflow of primary heat carrier through said primary closed cycle as a function of the outlet temperature of said flue gases from the furnace in order to keep such flue gas-outlet temperature substantially at a predetermined value.

10. Furnace for the combustion of low-grade fuels, such as refuse, without direct heat recovery comprising a combustion compartment for the burning of a low-grade fuel, a primary heat exchanger arranged internally of the furnace, said primary heat exchanger being contacted by the flue gases emanating from burning of the low-grade fuel, means providing a primary closed cycle with said primary heat exchanger for the circulation of a primary heat carrier through said primary heat exchanger, an additional heat exchanger disposed externally of said furnace and in said primary closed cycle for said heat carrier, said additional heat exchanger serving for the indirect recovery of at least a portion of the heat generated in said furnace, a heat-consumer operably connected with said additional heat exchanger, a secondary heat exchanger serving as a heat-dissipating cooler arranged in said primary closed cycle externally of said furnace and in series with said additional heat exchanger capable of dissipating heat independently of or simultaneously with said additional heat exchanger, said primary and secondary heat exchangers being designed with regard to the thermal rated load of said furnace, and means for controlling the throughflow of primary heat carrier through said primary closed cycle as a function of the outlet temperature of said flue gases from the furnace in order to keep such flue gas-outlet temperature substantially at a predetermined value.

11. Furnace for the combination of low-grade fuels, such as refuse, without direct heat recovery comprising a combustion compartment for the burning of a low-grade fuel, a primary heat exchanger arranged internally of the furnace, said primary heat exchanger being contacted by the flue gases emanating from burning of the low-grade fuel, means providing a primary closed cycle with said primary heat exchanger for the circulation of a primary heat carrier through said primary heat exchanger, an additional heat exchanger disposed externally of said furnace and in said primary closed cycle for said heat carrier, said additional heat exchanger serving for the indirect recovery of at least a portion of the heat generated in said furnace, a heat-consumer operably connected with said additional heat exchanger, a secondary heat exchanger serving as a heat-dissipating cooler arranged in said primary closed cycle externally of said furnace and in series with said additional heat exchanger capable of dissipating heat independently of or simultaneously with said additional heat exchanger, means providing a secondary cycle for the flow of a secondary heat carrier from said additional heat exchanger to said heat-consumer, a regulating member for controlling the throughflow of secondary heat carrier to said heat-consumer arranged in said secondary cycle, and means for controlling the throughflow of primary heat carrier through said primary closed cycle as a function of the outlet temperature of said flue gases from the furnace in order to keep such flue gas-outlet temperature substantially at a predetermined value.

References Cited by the Examiner
UNITED STATES PATENTS

| | | | |
|---|---|---|---|
| 2,593,963 | 4/1952 | Biggs | 122—33 |
| 2,823,650 | 2/1958 | Hedback et al. | 122—32 |
| 3,106,192 | 10/1963 | Hingst | 122—7 |
| 3,202,134 | 8/1965 | Marcheix | 122—7 X |

KENNETH W. SPRAGUE, *Primary Examiner.*